United States Patent [19]

Newman, Sr.

[11] 4,144,833
[45] Mar. 20, 1979

[54] EMERGENCY DISTRESS SIGNAL

[76] Inventor: Edward G. Newman, Sr., 31 Cherry Ridge Rd., P.O. Box 381, Hewitt, N.J. 07421

[21] Appl. No.: 862,084

[22] Filed: Dec. 19, 1977

[51] Int. Cl.² .............................................. B60Q 1/52
[52] U.S. Cl. ............................ 116/28 PR; 116/63 P; 116/173
[58] Field of Search .................... 116/173, 28 R, 63 P; 362/398

[56] References Cited

U.S. PATENT DOCUMENTS

| 1,325,973 | 12/1919 | Aronson | 116/173 |
| 2,875,324 | 2/1959 | Camp | 116/28 R |
| 3,286,682 | 11/1966 | Cook | 116/173 |
| 3,924,117 | 12/1975 | Brindley | 362/398 |

Primary Examiner—S. Clement Swisher
Assistant Examiner—Denis E. Corr
Attorney, Agent, or Firm—James J. Cannon, Jr.; James J. Cannon

[57] ABSTRACT

An emergency distress signal device for use on vehicles and the like having a semi-adaptable magnetic base member and a telescopic mast whose base is secured within said base member. The mast has a semi-circular, fixed loop at its peak for attachment of a flag. A flexible flag of a generally rectangular shape has a grommet on its upper and lower interior corners. A wire loop running through the upper grommet and the fixed semi-circular loop attaches the flag to the upper end of the mast. A second wire loop passing through the lower grommet and around the mast serves to fully secure the flag to the mast and permits the mast to be telescoped inwardly and outwardly without removing the flag. When the mast is fully retracted, the flag may be folded and wrapped around the short segment of the mast remaining above the base member, thus providing a very compact device for storage in a convenient pouch.

1 Claim, 2 Drawing Figures

EMERGENCY DISTRESS SIGNAL

BACKGROUND OF THE INVENTION

1. Field of the Invention

This invention pertains to emergency distress signal devices and, in particular, to signal devices having a magnetic base for attachment to a structure, a telescoping mast and a signal flag.

2. Description of the Prior Art

Many emergency signal flags are disclosed in the prior art. Some have magnetic attachment means such as those disclosed in U.S. Pat. Nos. 3,241,516 and 4,028,827. Neither of these devices uses an adjustable magnetic means of attachment. The vehicle device of U.S. Pat. No. 3,241,516 is too expensive to manufacture to be commercially viable. A number of prior art devices utilize a U-shaped carrying clip disposed on the upper edge of a vehicle window as a means of attachment, such as that disclosed in U.S. Pat. No. 4,015,557. These devices are not desirable because they tend to scratch the window glass and cannot be used if the window does not open. Many prior art devices are simply too complex in structure, too expensive to manufacture, and too inconvenient for ease of storage to be commercially viable, such as that disclosed in U.S. Pat. No. 3,387,584. Many prior art devices attach to the drain channel of a vehicle, such as that disclosed in U.S. Pat. No. 3,136,289. Because vehicle designs vary so much, these devices are often not transferrable from vehicle to vehicle. Some prior art devices are simply attach to a radio antenna. More often than not, the radio antenna is on the side of the vehicle which is least visible. Finally, some prior art devices utilize telescoping masts, such as those disclosed in U.S. Pat. Nos. 3,895,348 and 3,933,117. The first of these is too expensive to manufacture and cannot be transferred from vehicle to vehicle. The second does not have a reliable means of attachment and a conventional distress flag.

It is the principle object of this invention to provide a very simple, inexpensive and compact emergency distress signal which may be attached to any ferro-magnetic portion of a vehicle, thus providing flexibility in choosing a location of maximum visibility.

It is further object of this invention to provide a magnetic means of attachment which is adaptable to the curved and irregular contours of vehicle frames.

It is still a further object of this invention to provide an extremely compact emergency distress signal which may be collapsed and placed in a small carrying case for easy storage in a glove compartment.

SUMMARY OF THE INVENTION

This invention pertains to an emergency distress signal for use primarily in connection with motor vehicles which become disabled upon a pubic highway. It includes a base housing assembly, having magnetic means of attachment, a telescopic mast assembly, whose base is secured within said base housing and a flag assembly, attached to the top of said mast such that said mast may be telscoped inwardly and outwardly without removing said flag. protrude The base housing assembly is a rectangular structure having two oppposed large sides forming the front and rear panels of said housing and four elongated narrow panels on each large panel forming the sides, top and bottom of each of said housing panels. The rear panel has two pairs of vertically oriented rectangular openings. Within said housing are placed two iron-magnet assemblies. Each of said assemblies consists of two opposed L-Shaped, vertically oriented iron angles having a magnet secured between them such that the magnet is positioned in contact with base leg and the lower half of the side leg of each angle and that there is a separation between the base legs. The upper portions of the side legs are designed to prorude through the vertically oriented rectangular openings in the rear panel of the housing. The iron-magnet assemblies are fit loosely within the housing so that the protruding portion of their upper legs may move freely to conform to the surface contours of the exterior ferro-magnetic sheet metal of a vehicle.

The base of the telescopic mast is secured at three points within said base housing assembly and extends upward vertically through a centrally located opening in the top of the housing. When fully retracted, the mast will extend above the housing a distance equal to one-half the vertical dimensions of the flag. A semi-circular wire loop is secured to the top of the mast to provide a means for attachment of the top of the signal flag.

A standard distress signal flag is a twelve inch by twelve inch piece of white fabric or flexible plastic material. In this invention, a metal grommet is secured in the upper and lower corners of the side adjacent to the mast. On wire loop secures the upper grommet to the semi-circular loop at the top of the mast. A second wire loop passes through the lower grommet and around the mast such that the mast can be extended and retracted through this loop.

In the retracted position, the telescopic mast is retracted such that it protrudes somewhat above the housing. As it is retracted, the lower wire loop is moved upward toward the top of the mast. As this happens, the flag portion is folded in half and the mast is fully retracted. The folded flag is than wrapped around the mast for storage and the device of this invention is now sufficiently compact to be placed in a convenient case and stored in a glove compartment.

The adjustable magnetic attachment means provides an emergency distress signal which is convenient to store, simple to use and easy to position for maximum visibility.

DESCRIPTION OF THE PREFERRED EMBODIMENT

Figure 2:
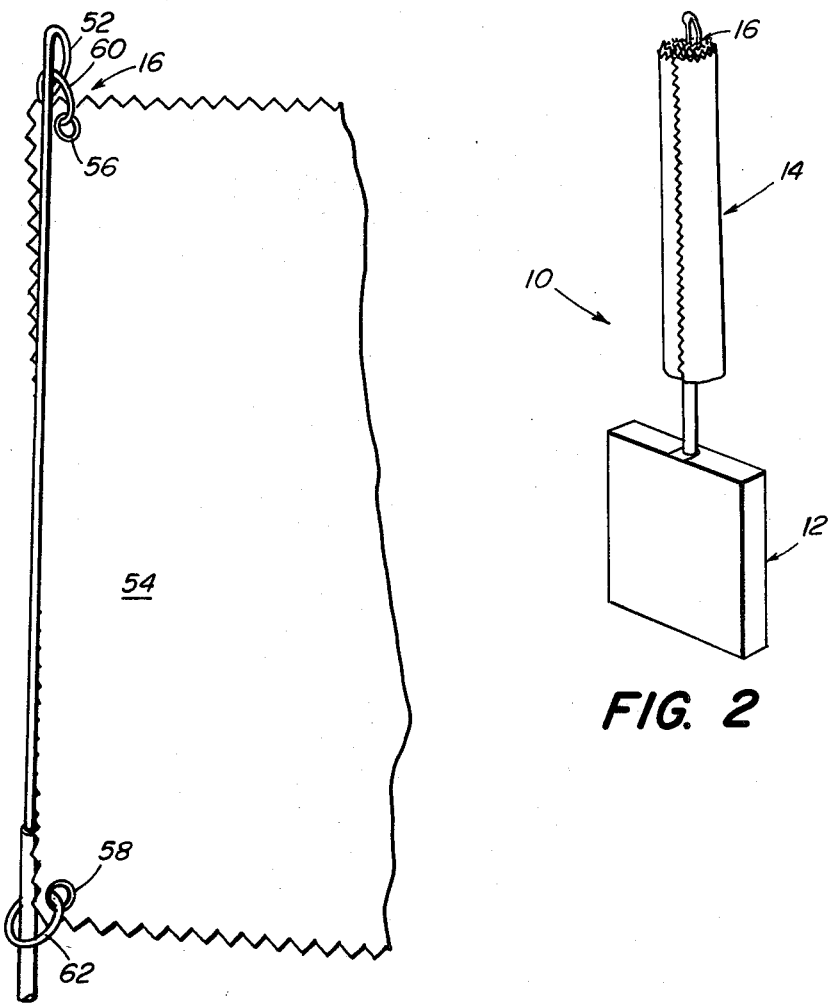
FIG. 2 is a perspective view of the device of the present invention in its fully retracted position with the flag folded and rolled, ready for storage.

Referring now to the drawings, emergency distress signal device 10, intended primarily for use on motor vehicles, consists of three basic assemblies, a base housing assembly 12, a telescopic mast assembly 14 and a flag assembly 16.

Base assembly 12 is composed of two sections, front panel section 18 and rear panel section 20. Front panel section 18 has a relatively square front panel 22, two narrow, elongated side walls 24, a bottom 26 and a top 28. Rear panel section 20 has a rear panel 30, sides 32, a base and a top 34. Rear panel 30 has two pair of vertical, elongated, rectangular slots 39. The dimensions of front panel section 18 are such that it can be snuggly fitted within rear panel section 20.

Included within base assembly 12 are a pair of iron-magnet assemblies 36. Each assembly 36 has a pair of ferro-magnetic elongated angles 38 which are generally L-shaped with a magnet 40 disposed between the opposed angles 38, secured to their base legs 42 and a portion of their side legs 44. Base legs 42 of each assembly are spaced apart at point 46. Side legs 44 extend forward of magnet 40 and protrude through rectangular slots 39, thus providing an adaptable means of attachment to ferro-magnetic exterior surface areas of vehicles which is adaptable to changes in surface contours.

Mast assembly 14 is a standard telescoping mast whose base portion 48 is secured within base assembly 12 and extends upward through an opening 50 in top panels 28,34. Mast assembly terminates at its upper end in a semi-circular loop 52. Mast assembly 14 does not fully retract into base assembly 12. When mast assembly 14 is fully telescoped to a closed position, the peak of mast assembly 14 and semi-circular loop 52 project above base assembly 12 a distance about equal to one-half the vertical dimension of flag assembly 14.

Figure 1:
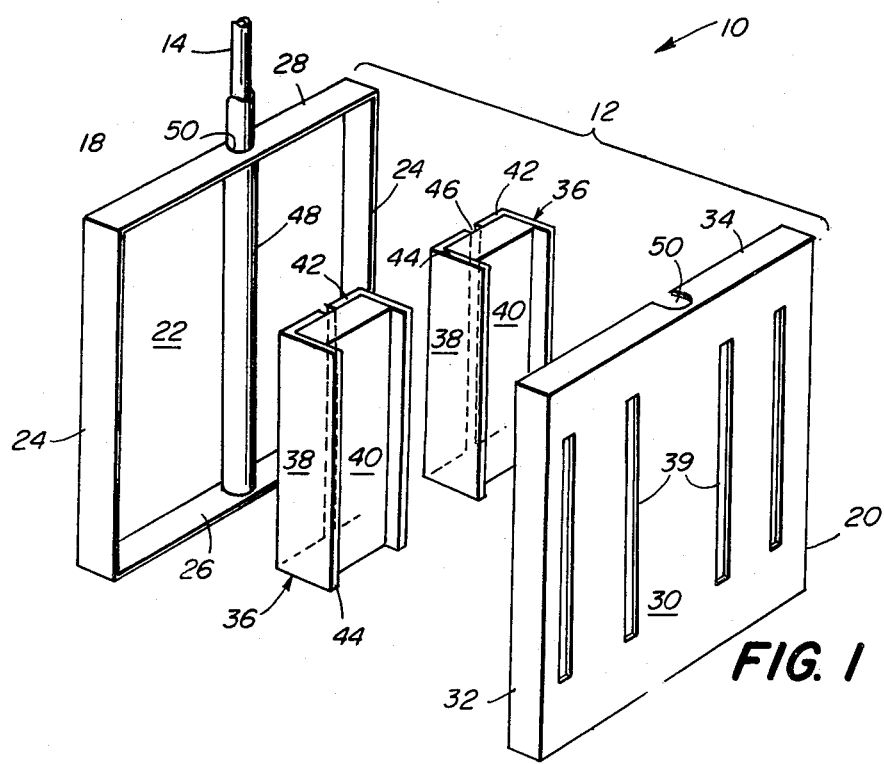
FIG. 1 is an exploded view of the emergency distress signal of the present invention in its fully extended position.

Flag assembly 16 consists of a white flag 54, approximately twelve inches by twelve inches square, which are current standards for distress flags, fabricated from a flexible fabric or plastic cloth. Flag 54 has two grommets 56, 58 which are installed in its upper and lower inner corners respectively. A wire loop 60 passes through grommet 56 and semicircular loop 52 to secure flag 54 to the peak of mast assembly 14. A second wire loop 62 passes through lower grommet 56 and around mast assembly 14. This permits mast assembly to be extended and retracted through second wire loop 62. If mast assembly 14, as shown in FIG. 1 is retracted to the storage position of FIG. 2, second wire loop 62 will slide upwards relatively to meet first wire loop 60 at the peak of mast assembly 14, thus causing flag 54 to fold in half. Flag 54 thus folded is wrapped around retracted mast assembly 14 for storage.

FIG. 2 is a side perspective view of emergency distress signal 10 in its storage position. Telescopic mast assembly 14 is fully retracted, flag assembly 16 is fully wrapped around that portion of mast assembly 14 which protrudes above base assembly 12. This figure illustrates that the compactness of emergency distress signal in its storage position.

While an embodiment of this invention has been described and shown by way of illustration, many modifications within the true spirit and scope of this invention and within the scope of the claim will occur to those skilled in the art.

I claim:

1. An emergency distress signal device comprising in combination:
   a base assembly having front and rear panels and top, bottom and side panels to form a substantially rectangular housing;
   a plurality of rectangular, vertically oriented slots cut away from said rear panel;
   a plurality of generally U-shaped magnetic assemblies positioned within said base assembly having two L-shaped angles, a magnet disposed between said angles, and the vertical legs of said angles being positioned through said slots in said rear panel;
   a telescoping mast whose base is secured within said base assembly, and protruding only through the top thereof and having a semicircular loop at its peak;
   a distress signal flag of flexible fabric or plastic material having grommets on its upper and lower corners along its vertical edge;
   a first loop connecting said upper grommet to said semi-circular loop;
   a second loop passing through said lower grommet and around said mast assembly.

* * * * *